(12) United States Patent
Fang et al.

(10) Patent No.: US 10,446,836 B2
(45) Date of Patent: Oct. 15, 2019

(54) METHOD FOR PREPARING A POSITIVE ACTIVE MATERIAL FOR A LITHIUM SECONDARY BATTERY

(71) Applicant: Ningde Amperex Technology Limited, Ningde, Fujian (CN)

(72) Inventors: Xiangpeng Fang, Fujian (CN); Chengren Wu, Fujian (CN); Na Liu, Fujian (CN); Xuguang Gao, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 6 days.

(21) Appl. No.: 14/935,451

(22) Filed: Nov. 9, 2015

(65) Prior Publication Data

US 2016/0351898 A1    Dec. 1, 2016

(30) Foreign Application Priority Data

May 26, 2015 (CN) .......................... 2015 1 0272462

(51) Int. Cl.
*H01M 4/36* (2006.01)
*H01M 4/58* (2010.01)
*H01M 10/0525* (2010.01)

(52) U.S. Cl.
CPC ......... *H01M 4/366* (2013.01); *H01M 4/5825* (2013.01); *H01M 10/0525* (2013.01); *H01M 2220/20* (2013.01); *Y02E 60/122* (2013.01)

(58) Field of Classification Search
CPC ............... H01M 4/366; H01M 4/5825; H01M 10/0525; H01M 2220/20; Y02E 60/122
USPC ........................................................ 252/500
See application file for complete search history.

(56) References Cited

U.S. PATENT DOCUMENTS

| | | | | |
|---|---|---|---|---|
| 2012/0164319 | A1* | 6/2012 | Lang | ..................... H01M 4/136 427/126.6 |
| 2014/0054494 | A1* | 2/2014 | Huang | ..................... C01B 25/45 252/182.1 |
| 2014/0099540 | A1* | 4/2014 | Chen | ..................... H01M 4/505 429/211 |

FOREIGN PATENT DOCUMENTS

| | | |
|---|---|---|
| CN | 102332563 A | 1/2012 |
| CN | 103035906 A | 4/2013 |
| JP | 2013191540 A | 9/2013 |

* cited by examiner

*Primary Examiner* — Harold Y Pyon
*Assistant Examiner* — Danny N Kang

(57) ABSTRACT

The present invention provides a method for preparing a positive active material for a secondary lithium battery. The method includes the steps of: synthesizing an intermediate product of a core represented by formula $Li_xM_yN_{1-y}O_{2-\alpha}A_\beta$; adding P source into the intermediate product to obtain a phosphate which does not contain lithium; and adding lithium source into the mixture of the phosphate and $Li_xM_yN_{1-y}O_{2-\alpha}A_\beta$ and sintering to obtain the positive active material for secondary lithium battery. The method for preparing a positive active material for a secondary lithium battery of the present invention has the following advantages: 1) the P source can be dispersed on the surface of the core more uniformly; 2) the coating layer can be bonded to the core more tightly; and 3) the positive active material has higher rate discharge performance.

11 Claims, No Drawings

METHOD FOR PREPARING A POSITIVE ACTIVE MATERIAL FOR A LITHIUM SECONDARY BATTERY

CROSS-REFERENCE TO RELATED APPLICATION

The present patent application claims priority to Chinese patent application number CN 201510272462.3 filed on May 26, 2015, which is incorporated by reference herein in its entirety.

BACKGROUND

The present invention generally relates to secondary lithium batteries and, more particularly, to a method for preparing a positive active material of a secondary lithium battery.

DESCRIPTION OF RELATED ART

At present, lithium transition metal oxide $LiMO_2$ (wherein M is Mn, Co, Ni et al., $LiMO_2$ includes lithium cobalt oxide and various kinds of transition metal materials) are widely used in commercialized secondary lithium batteries. So far, lithium transition metal oxides have been considered as desirable positive active materials for new generation of hybrid vehicle batteries due to cheap price and simple synthesis process. With development of technology, more and more attention has been paid to the energy density and the electrochemical performances of secondary lithium batteries. Therefore, there is still a need to further improve the performances of the positive active materials.

Surface treatment, for instance dry coating and wet coating, can be used to improve the electrochemical performances of the positive active materials. At present, compounds, such as $Al_2O_3$, $AlPO_4$, $ZrO_2$, $TiO_2$, $B_2O_3$, are widely used to coat the positive active material via dry coating or wet coating, to improve surface structural stability of the positive active material and improve the cycling performance of secondary lithium batteries at high voltage. However, conventional coating method and positive active materials prepared via conventional coating method at least have the following disadvantages: 1) when the coating amount is small, the core cannot be coated properly; when the coating amount is too much, the capacity of the positive active material is adversely affected although the cycling performance can be improved remarkably; 2) the coating area cannot be controlled, dot coating or sheeted coating may occur on the core; 3) the coating layer is bonded to the core via physical adsorption, and the bonding between the coating layer and the core is unstable.

In view of the foregoing, what is needed, therefore, is to provide a method for preparing a positive active material for a secondary lithium battery which has desirable coating effect.

BRIEF SUMMARY

One object of the present invention is to provide a method for preparing a positive active material for a secondary lithium battery, which can improve specific capacity, cycling performance and safety performance of the positive active material for a secondary lithium battery.

According to one embodiment of the present invention, a method for preparing a positive active material for a secondary lithium battery is provided. The method includes the steps of:

1) synthesizing an intermediate product of a core represented by formula $Li_xM_yN_{1-y}O_{2-\alpha}A_\beta$, wherein the intermediate product is a compound containing an element represented by M, or is a compound containing elements represented by M and N;
2) adding P source into the intermediate product of step 1) and sintering a mixture of the P source and the intermediate product at 200~1200° C., to obtain an intermediate product coated with a coating layer which does not contain lithium;
3) adding an easily degradable lithium salt into the intermediate product obtained in step 2) and sintering a mixture of the intermediate product coated with the coating layer which does not contain lithium and the easily degradable lithium salt at 400~1200° C., and obtaining a positive active material including a core and a coating layer coating the core, wherein the core of the positive active material is a lithium transition metal oxide represented by formula $Li_xM_yN_{1-y}O_{2-\alpha}A_\beta$, the coating layer is a lithium transition metal phosphate represented by formula $Li_aM_bN'_{1-b}PO_{4-\lambda}B_\zeta$ in situ formed on a surface of the core, and element represented by M is at least one of Ni, Co and Mn; element represented by N and N' each is at least one of Na, K, Rb, Cs, Be, Mg, Ca, Sr, Ba, Ra, Al, Ga, In, Ge, Sn, Sc, Ti, V, Cr, Mn, Fe, Co, Ni, Cu, Zn, Y, Zr, Nb, Mo, Ru, Rh, Pd, Ag, Cd, La, Ce, Pr, Nd, Sm, Eu, Gd, Tb, Dy, Ho, Er, Tm, Yb, Lu; element represented by A and B each is at least one of N, F, P, S, Cl, Se; and $0.9 \le x \le 1.2$, $0.6 \le y \le 1.0$, $0.9 \le a \le 1.1$, $0.6 \le b \le 1.0$, $0 \le \alpha \le 0.2$, $0 \le \beta \le 0.4$, $0 \le \lambda \le 0.5$, $0 \le \zeta \le 0.5$.

According to one aspect of the present invention, the intermediate product synthesized in step 1) is obtained via one of solid milling method, liquid coprecipitation method, sol-gel method, combustion method, solvothermal method and Pechini method.

According to one aspect of the present invention, the intermediate product synthesized in step 1) is a hydroxide; a nitrate; a carbonate; an acetate; an oxalate; an organic salt containing C, N, O and H; or is oxide particle obtained via sintering a mixture comprising two or more of a hydroxide; a nitrate; a carbonate; an acetate; an oxalate; an organic salt containing C, N, O and H.

According to one aspect of the present invention, the intermediate product synthesized in step 1) comprises loose secondary particles, secondary aggregates of loose nano particles, compact primary single crystal particles, compact secondary particles or any mixture thereof.

According to one aspect of the present invention, the P source in step 2) comprises at least one of elementary substance P, $P_2O_3$, $P_2O_5$, $H_3PO_4$, $H_3PO_3$, $H_3PO_2$, $(NH_4)_3PO_4$, $(NH_4)_2HPO_4$, $(NH_4)H_2PO_4$, $(NH_4)_3PO_3$, $(NH_4)_3PO_2$, $Li_3PO_4$, $Li_2HPO_4$, $LiH_2PO_4$, phosphate ester, phosphite ester, and a compound containing element P and at least two elements of Li, C, H, O, N.

According to one aspect of the present invention, the P source in step 2) uniformly disperses on the surface of the particles of the intermediate product via one of solid milling method, solvothermal method, sol-gel method, liquid phase mixing method and vapor deposition method.

According to one aspect of the present invention, the P source in step 2) is added via solid milling method. In this case, the P source has a small particle size and a large surface area. Therefore, the P source is preferably one of elementary substance P, $P_2O_3$, $P_2O_5$, $Li_3PO_4$, $Li_2HPO_4$, $LiH_2PO_4$, phosphate ester, phosphite ester.

According to one aspect of the present invention, the P source in step 2) is added via one of solvothermal method, sol-gel method, liquid phase mixing method and vapor deposition method. In this case, the P source is a substance easily degradable in the solvent. Therefore, the P source is preferably one of $H_3PO_4$, $H_3PO_3$, $H_3PO_2$, $(NH_4)_3PO_4$, $(NH_4)_2HPO_4$, $(NH_4)H_2PO_4$, $(NH_4)_3PO_3$, $(NH_4)_3PO_2$.

According to one aspect of the present invention, in step 2) the P source and the element represented by N' are added at the same time, N' and N are same or different.

According to one aspect of the present invention, the sintering temperature in step 2) is preferably 500~900° C.

According to one aspect of the present invention, the phosphate on the surface of the core obtained via sintering in step 2) is a phosphate of element represented by M, or a phosphate of elements represented M and N'.

According to one aspect of the present invention, the easily degradable lithium salt in step 3) is at least one of lithium carbonate, lithium hydroxide monohydrate, lithium hydroxide, lithium nitrate, lithium fluoride, lithium acetate and lithium oxalate, and preferably at least one of lithium hydroxide monohydrate, lithium acetate, lithium hydroxide and lithium carbonate.

According to one aspect of the present invention, the sintering temperature in step 3) is preferably 500~900° C.

Compared with the prior art, the method for preparing a positive active material for a secondary lithium battery of the present invention includes the steps of: synthesizing an intermediate product of a core represented by formula $Li_xM_yN_{1-y}O_{2-\alpha}A_\beta$; adding a P source into the intermediate product and obtaining an intermediate product coated with a coating layer which does not contain lithium; and adding a lithium source into the mixture of the phosphate and $Li_{x-}M_yN_{1-y}O_{2-\alpha}A_\beta$, and sintering and obtaining the positive active material for a secondary lithium battery. Adding a P source into the intermediate product has the following advantages:

1) the positive active material according to the present invention has higher specific capacity, because the lithium resource of the coating layer and the core both come from step 3), which can facilitate the formation of higher specific capacity material.

2) the intermediate product does not subject to lithiation, the P source can disperse and deposit evenly on the surface the intermediate product, which can facilitate even formation of the phosphate and tight bonding between the coating layer and the core.

3) during the lithiation procedure, lithium ions diffuse from the outer side of the phosphate into the inner side of the core, which can facilitate the synthesis of the positive active material having high ion conductivity.

4) the synthesis process is simple and controllable and, therefore, is suitable for various kinds of industrial production.

The positive active material according to the present invention has higher specific capacity, desirable cycling performance and safety performance. The positive active material according to the present invention has a wider operating voltage range (having a voltage upper limit of 4.1V-4.7V) and stable thermal stability. The secondary lithium battery containing the positive active material of the present invention has high volumetric energy density and desirable cycling performance.

Examples of the present invention will now be described more fully hereinafter, in which some, but not all examples of the invention are shown. Indeed, the invention may be embodied in many different forms and should not be construed as limited to the examples as set forth herein; rather, these examples are provided so that this disclosure will satisfy applicable legal requirements.

DETAILED DESCRIPTION OF VARIOUS EMBODIMENTS

Example 1

The positive active material of Example 1 includes a core of $Li_{1.09}Ni_{0.1}Co_{0.5}Mn_{0.4}O_2$ obtained via coprecipitation method and a coating layer of $Li_{1.09}Ni_{0.1}Co_{0.5}Mn_{0.4}PO_4$. The method for preparing the positive active material of Example 1 includes the steps of:

Synthesizing an intermediate product of the core via coprecipitation method: dissolving $NiSO_4$, $CoSO_4$, $MnSO_4$ at a metal atom ratio of 0.1:0.5:0.4 in deionized water and obtaining a mixed solution of 1 mol/L; adding 1 mol/L NaOH solution into the mixed solution, fully stirring the mixed solution and maintaining the temperature at 75° C., and obtaining loose spherical secondary particles having an average size of 20 μm-21 μm after full reaction; repeatedly washing the coprecipitate with deionized water and ethanol; sintering the washed coprecipitate in air at 500° C. for 5 hours;

Mixing $P_2O_5$ with the sintered coprecipitate at a mass ratio of 0.0024:1, sintering the mixture of $P_2O_5$ and the sintered coprecipitate in a planetary ball mill having a rotation speed of 300 r/min for 5 hours, and further sintering the mixture in air at 750° C. for 10 hours;

Mixing the sintered mixture with $LiOH \cdot H_2O$, sintering the mixture in air at 900° C. for 10 hours, and obtaining a positive active material including a core of $Li_{1.09}Ni_{0.1}Co_{0.5}Mn_{0.4}O_2$ and a coating layer of $Li_{1.09}Ni_{0.1}Co_{0.5}Mn_{0.4}PO_4$.

Example 2

The positive active material of Example 2 includes a core of $Li_{1.10}Ni_{1/3}Co_{1/3}Mn_{1/3}O_2$ obtained via coprecipitation method and a coating layer of $Li_{1.10}Ni_{1/3}CO_{1/3}Mn_{1/3}PO_4$. The method for preparing the positive active material of Example 2 includes the steps of:

Preparing the precursor via coprecipitation method: dissolving $NiSO_4$, $CoSO_4$, $MnSO_4$ at an atom ratio of 1.0:1.0:1.0 in deionized water and obtaining a mixed solution of 1 mol/L; adding 1 mol/L NaOH solution into the mixed solution, fully stirring the mixed solution and maintaining the temperature at 75° C., and obtaining loose spherical secondary particles having an average size of 50 μm after full reaction; repeatedly washing the coprecipitate with deionized water and ethanol;

Mixing $(NH_4)_3PO_4$ with the sintered coprecipitate at a mass ratio of 0.0001:1 and sintering the mixture of the coprecipitate and $(NH_4)_3PO_4$ in a planetary ball mill having a rotation speed of 300 r/min for 5 hours, and further sintering the mixture in air at 650° C. for 10 hours;

Mixing the sintered mixture with $LiOH \cdot H_2O$, sintering the mixture in air at 900° C. for 20 hours, and obtaining a positive active material including a core of $Li_{1.10}Ni_{1/3}Co_{1/3}Mn_{1/3}O_2$ and a coating layer of $Li_{1.10}Ni_{0.333}Co_{0.333}Mn_{0.333}PO_4$.

Example 3

The positive active material of Example 3 includes a core of $Li_{1.08}Ni_{0.5}Co_{0.2}Mn_{0.3}O_2$ obtained via combustion method and a coating layer of $Li_{1.08}Ni_{0.5}Co_{0.2}Mn_{0.3}PO_4$. The method for preparing the positive active material of Example 3 includes the steps of:

Dissolving nickel nitrate, cobalt nitrate, manganese nitrate at an atom ratio of 0.50:0.20:0.30 in ethanol in a container and obtaining a mixed solution; adding glycerol into the mixed solution after nickel nitrate, cobalt nitrate and manganese nitrate being fully dissolved, the ratio of glycerol to the total metal ions is 3:1; stirring the mixed solution in the container in a water bath at 80° C. to evaporate the ethanol; moving the container to a resistance furnace and heating after the ethanol being fully evaporated, until the residue of the mixed solution fully combusting; collecting the black combustion products and sintering the black combustion products in air at 750° C. for 5 hours and obtaining particles having an average particle size of 0.5-0.8 µm;

Dissolving $H_3PO_4$ and the particles at a mass ratio of 0.10:1 in 500 mL deionized water in a container and obtaining a mixed solution; after $H_3PO_4$ and the particles being fully dissolved, moving the container to a water bath at 85° C. and stirring to evaporate the water; sintering the residual of the mixed solution in air at 200° C. for 5 hours and obtaining black powders;

Mixing the black powders with $LiOH.H_2O$, sintering the mixture in air at 850° C. for 12 hours, and obtaining a positive active material including a core of $Li_{1.08}Ni_{0.5}Co_{0.2}Mn_{0.3}O_2$ and a coating layer of $Li_{1.08}Ni_{0.5}Co_{0.2}Mn_{0.3}PO_4$.

Example 4

The positive active material of Example 4 includes a core of $Li_{1.01}Ni_{0.5}CO_{0.2}Mn_{0.29}Zr_{0.01}O_{1.98}F_{0.04}$ obtained via sol-gel method and a coating layer of $Li_{1.01}Ni_{0.5}Co_{0.2}Mn_{0.29}Zr_{0.01}PO_{3.98}F_{0.04}$. The method for preparing the positive active material of Example 4 includes the steps of:

Dissolving nickel acetate, cobalt acetate, manganese acetate, nano titanium dioxide, ammonium fluoride at an atom ratio of 0.50:0.20:0.29:0.01:0.04 in deionized water in a container and obtaining a mixed solution; adding citric acid into the mixed solution after nickel acetate, cobalt acetate, manganese acetate, nano-titanium dioxide, ammonium fluoride being fully dissolved, the ratio of citric acid to the total metal ions is 2:1; stirring the mixed solution in the container in a water bath at 85° C. to evaporate the water and obtain gelatinous substance; moving the container to an oven at a 160° C. and heating for 5 hours, and obtaining brown-black substance; milling the brown-black substance into powders, sintering the powders in air at 750° C. for 25 hours and obtaining particles having an average particle size of 3.5-6.5 µm;

Dissolving $(NH_4)_3PO_4$ and the particles at a mass ratio of 0.0268:1 in 500 mL deionized water in a container and obtaining a mixed solution; placing the container having the mixed solution in a water bath at 85° C. and stirring to evaporate the water; moving the container into an oven at 160° C. for 5 hours and obtaining black powders; sintering the black powders in air at 650° C. for 4 hours;

Mixing the sintered black powders with $LiOH.H_2O$, sintering the mixture in air at 950° C. for 24 hours, obtaining a positive active material including a core of $Li_{1.01}Ni_{0.5}Co_{0.2}Mn_{0.29}Zr_{0.01}O_{1.98}F_{0.04}$ and a coating layer of $Li_{1.01}Ni_{0.5}Co_{0.2}Mn_{0.29}Zr_{0.01}PO_{3.98}F_{0.04}$.

Example 5

The positive active material of Example 5 includes a core of $Li_{0.98}Ni_{0.6}Co_{0.18}Mn_{0.2}Ti_{0.02}O_2$ obtained via coprecipitation method and a coating layer of $Li_{0.98}Ni_{0.6}Co_{0.18}Mn_{0.2}Ti_{0.02}PO_4$. The method for preparing the positive active material of Example 5 includes the steps of:

Preparing the precursor via coprecipitation method: dissolving $NiSO_4$, $CoSO_4$, $MnSO_4$, nano $TiO_2$ at an atom ratio of 0.60:0.18:0.20:0.02 in deionized water and obtaining a mixed solution of 1 mol/L; adding 1 mol/L NaOH solution into the mixed solution, fully stirring the mixed solution and maintaining the temperature at 75° C.; obtaining coprecipitate of loose spherical secondary particles having an average particles size of 8.0-12.0 µm after full reaction; washing the coprecipitate with deionized water and ethanol repeatedly; sintering the washed coprecipitate in air at 500° C. for 5 hours and obtaining black powders;

Mixing $P_2O_5$ with the black powders at a mass ratio of 0.002:1, sintering the mixture of the black powders and $P_2O_5$ in a planetary ball mill having a rotation speed of 500 r/min for 5 hours, and further sintering the mixture in air at 600° C. for 2 hours;

Mixing the sintered mixture with $Li_2CO_3$, sintering the mixture in air at 750° C. for 10 hours, and obtaining a positive active material including a core of $Li_{0.98}Ni_{0.6}Co_{0.18}Mn_{0.2}Ti_{0.02}O_2$ and a coating layer of $Li_{0.98}Ni_{0.6}Co_{0.18}Mn_{0.2}Ti_{0.02}PO_4$.

Example 6

The positive active material of Example 6 includes a core of $Li_{0.9}Ni_{0.75}Co_{0.15}Mn_{0.1}O_2$ obtained via coprecipitation method and a coating layer of $Li_{0.9}Ni_{0.75}Co_{0.15}Mn_{0.1}PO_4$. The method for preparing the positive active material of Example 6 includes the steps of:

Preparing the precursor via coprecipitation method: dissolving $NiSO_4$, $CoSO_4$, $MnSO_4$ at an atom ratio of 0.75:0.15:0.10 in deionized water and obtaining a mixed solution of 1 mol/L; adding 1 mol/L NaOH solution into the mixed solution, fully stirring the mixed solution and maintaining the temperature at 70° C., and obtaining loose spherical secondary particles having an average particle size of 8.0-10.0 µm after full reaction; repeatedly washing the coprecipitate with deionized water and ethanol; and sintering the washed coprecipitate in air at 500° C. for 5 hours;

Mixing $NH_4H_2PO_4$ with the sintered coprecipitate at a mass ratio of 0.0023:1 and sintering the mixture of the coprecipitate and $NH_4H_2PO_4$ in a planetary ball mill having a rotation speed of 300 r/min for 5 hours, and further sintering the mixture in air at 600° C. for 2 hours;

Mixing the sintered mixture with $Li_2CO_3$, sintering the mixture in air at 800° C. for 10 hours, and obtaining a positive active material including a core of $Li_{0.9}Ni_{0.75}Co_{0.18}Mn_{0.1}O_2$ and a coating layer of $Li_{0.9}Ni_{0.75}Co_{0.18}Mn_{0.1}PO_4$.

Example 7

The positive active material of Example 7 includes a core of $Li_{1.03}Ni_{0.8}Co_{0.1}Mn_{0.1}O_2$ obtained via coprecipitation method and a coating layer of $Li_{1.03}Ni_{0.72}Co_{0.09}Mn_{0.09}V_{0.1}PO_4$. The method for preparing the positive active material of Example 7 includes the steps of:

Preparing the precursor via coprecipitation method: dissolving $NiSO_4$, $CoSO_4$, $MnSO_4$ at an atom ratio of 0.80:0.10:0.10 in deionized water and obtaining a mixed solution of 1 mol/L; adding 1 mol/L NaOH solution into the mixed solution, fully stirring the mixed solution and maintaining the temperature at 75° C., and obtaining loose spherical secondary particles having an average particle size of 12.5-15.5 μm after full reaction; repeatedly washing the coprecipitate with deionized water and ethanol; and sintering the washed coprecipitate in air at 500° C. for 5 hours;

Mixing $(NH_4)_3PO_4$, $NH_4VO_3$ with the sintered coprecipitate at a mass ratio of 0.0045:0.0004:1 and sintering the mixture of the coprecipitate and $(NH_4)_3PO_4$, $NH_4VO_3$ in a planetary ball mill having a rotation speed of 300 r/min for 5 hours, and further sintering the mixture in air at 750° C. for 10 hours;

Mixing the sintered mixture with $LiOH.H_2O$, sintering the mixture in oxygen atmosphere at 900° C. for 20 hours, and obtaining a positive active material including a core of $Li_{1.03}Ni_{0.8}Co_{0.1}Mn_{0.1}O_2$ and a coating layer of $Li_{1.03}Ni_{0.72}Co_{0.09}Mn_{0.09}V_{0.1}PO_4$.

Example 8

The positive active material of Example 8 includes a core of $Li_{1.07}Ni_{0.82}Co_{0.10}Mn_{0.07}Zr_{0.004}Mg_{0.002}Ti_{0.004}O_2$ obtained via coprecipitation method and a coating layer of $Li_{1.07}Ni_{0.82}Co_{0.10}Mn_{0.07}Zr_{0.004}Mg_{0.002}Ti_{0.004}PO_4$. The method for preparing the positive active material of Example 8 includes the steps of:

Preparing the precursor via coprecipitation method: dissolving $NiSO_4$, $CoSO_4$, $MnSO_4$ at an atom ratio of 0.82:0.10:0.07 in deionized water and obtaining a mixed solution of 1 mol/L; adding 1 mol/L NaOH solution into the mixed solution, fully stirring the mixed solution and maintaining the temperature at 75° C., and obtaining loose spherical secondary particles having an average particle size of 15.0-18.0 μm after full reaction; repeatedly washing the coprecipitate with deionized water and ethanol; mixing the washed coprecipitate with nano $ZrO_2$, nano MgO, nano$TiO_2$ in an inclined mixer having a rotation speed of 50 r/min for 5 hours; sintering the mixture in air at 800° C. for 5 hours and obtaining black powders;

Dissolving $(NH_4)_3PO_4$ and the black powders at a mass ratio of 0.0026:1 in 500 mL deionized water in a container and obtaining a mixed solution; after $(NH_4)_3PO_4$ and the black powders being fully dissolved, moving the container having the mixed solution to a water bath at 90° C. and stirring to evaporate the water; moving the container to an oven at 140° C. and heating 5 hours and obtaining black powders; sintering the black powders in air at 650° C. for 6 hours;

Mixing the sintered black powders with $Li_2CO_3$, sintering the mixture in air at 750° C. for 10 hours, and obtaining a positive active material including a core of $Li_{1.07}Ni_{0.82}Co_{0.10}Mn_{0.07}Zr_{0.004}Mg_{0.002}Ti_{0.004}O_2$ and a coating layer of $Li_{1.07}Ni_{0.82}CO_{0.10}Mn_{0.07}Zr_{0.004}Mg_{0.002}Ti_{0.004}PO_4$.

Example 9

The positive active material of Example 9 includes a core of $Li_{0.95}Ni_{0.9}Co_{0.05}Mn_{0.04}Mg_{0.01}O_2$ obtained via coprecipitation method and a coating layer of $Li_{1.00}Ni_{0.9}Co_{0.05}Mn_{0.04}Mg_{0.01}PO_4$. The method for preparing the positive active material of Example 9 includes the steps of:

Preparing the precursor via coprecipitation method: dissolving $NiSO_4$, $CoSO_4$, $MnSO_4$ at an atom ratio of 0.9:0.05:0.04 in deionized water and obtaining a mixed solution of 1 mol/L; adding 1 mol/L NaOH solution into the mixed solution, fully stirring the mixed solution and maintaining the temperature at 70° C., and obtaining loose spherical secondary particles having an average particle size of 8.0-10.0 μm after full reaction; repeatedly washing the coprecipitate with deionized water and ethanol; mixing the washed coprecipitate with nano MgO at a mass ratio of 1:0.0033 in an inclined mixer having a rotation speed of 50 r/min for 5 hours; sintering the mixture in air at 500° C. for 5 hours;

Mixing and milling $NH_4H_2PO_4$ with the sintered mixture at a mass ratio of 0.0012:1 in a planetary ball mill having a rotation speed of 500 r/min for 5 hours; sintering the mixture of the sintered mixture and $NH_4H_2PO_4$ in air at 500° C. for 2 hours;

Mixing the sintered mixture with LiOH, sintering the mixture in air at 800° C. for 10 hours, obtaining a positive active material including a core of $Li_{0.95}Ni_{0.9}Co_{0.05}Mn_{0.04}Mg_{0.01}O_2$ and a coating layer of $Li_{1.00}Ni_{0.9}Co_{0.05}Mn_{0.04}Mg_{0.01}PO_4$.

Example 10

The positive active material of Example 10 includes a core of $Li_{1.05}Ni_{0.5}CO_{0.2}Mn_{0.28}Zr_{0.02}O_{1.98}F_{0.04}$ obtained via coprecipitation method and solid milling method and a coating layer of $Li_{1.05}Ni_{0.5}Co_{0.2}Mn_{0.28}Zr_{0.02}PO_{3.98}F_{0.04}$. The method for preparing the positive active material of Example 10 includes the steps of:

Dissolving $NiSO_4$, $CoSO_4$, $MnSO_4$ at an atom ratio of 0.50:0.20:0.28 in deionized water and obtaining a mixed solution of 1 mol/L; adding 1 mol/L NaOH solution into the mixed solution, fully stirring the mixed solution and maintaining the temperature at 70° C., and obtaining loose spherical secondary particles having an average particle size of 8.0-10.0 μm after full reaction; repeatedly washing the coprecipitate with deionized water and ethanol; mixing the washed coprecipitate with nano $ZrO_2$, $NH_4F$ in a zirconia sander having a rotation speed of 800 r/min for 5 hours, the diameter of the zirconia milling media is 3 mm, and the ratio of the zirconia milling media to the mixture of washed coprecipitate, nano $ZrO_2$ and $NH_4F$ is 1:1; removing the zirconia milling media and sintering the remained mixture in air at 950° C. for 24 hours and obtaining black powders;

Mixing $(NH_4)_2HPO_4$ with the black powders at a mass ratio of 0.0200:1 in a an inclined mixer having a rotation speed of 50 r/min for 10 hours; sintering the mixture of $(NH_4)_2HPO_4$ and the black powders in air at 750° C. for 6 hours;

Mixing the sintered mixture with $LiOH.H_2O$, sintering the mixture in air at 1050° C. for 10 hours, obtaining a positive active material including a core of $Li_{1.05}Ni_{0.5}Co_{0.2}Mn_{0.28}Zr_{0.02}O_{1.98}F_{0.04}$ and a coating layer of $Li_{1.05}Ni_{0.5}Co_{0.2}Mn_{0.28}Zr_{0.02}PO_{3.98}F_{0.04}$.

Example 11

The positive active material of Example 11 includes a core of $Li_{1.08}Ni_{1/3}Co_{1/3}Mn_{1/3}O_2$ and a coating layer of $Li_{1.08}Ni_{1/3}Co_{1/3}Mn_{1/3}PO_4$. The method for preparing the positive active material of Example 11 includes the steps of:

Preparing the polycrystalline particle precursor via coprecipitation method: dissolving $NiSO_4$, $CoSO_4$, $MnSO_4$ at an atom ratio of 1.0:1.0:1.0 in deionized water and obtaining a mixed solution of 1 mol/L; adding 1 mol/L NaOH solution into the mixed solution, fully stirring the mixed solution and maintaining the temperature at 75° C., and obtaining loose spherical secondary particles having an average particle size of 4.0-7.0 μm after full reaction; repeatedly washing the coprecipitate with deionized water and ethanol; sintering the washed coprecipitate in air at 500° C. for 5 hours and obtaining a polycrystalline particle precursor;

Preparing mono crystalline particle precursor via solid milling method: mixing nickel oxalate, cobalt oxalate, $MnCO_3$ at a mole rate of 1.0:1.0:1.0 in a zirconia sander having a rotation speed of 1000 r/min for 5 hours, the diameter of the zirconia milling media is 5 mm, and the ratio of the zirconia milling media to the mixture of nickel oxalate, cobalt oxalate, $MnCO_3$ is 1:1; removing the zirconia milling media and sintering the remaining mixture in air at 700° C. for 5 hours;

Mixing the mono crystalline particle precursor with the polycrystalline particle precursor, mixing $P_2O_5$ with the mixture of the mono crystalline particle precursor and the polycrystalline particle precursor at a mass ratio of 0.0005:1; sintering the mixture in air at 700° C. for 10 hours;

Mixing LiOH with the sintered mixture in air at 800° C. for 5 hours, and obtaining the positive active material having a core of $Li_{1.08}Ni_{1/3}CO_{1/3}Mn_{1/3}O_2$ and a coating layer of $Li_{1.08}Ni_{1/3}CO_{1/3}Mn_{1/3}PO_4$;

Example 12

The positive active material of Example 12 includes a core of $Li_{1.03}Ni_{0.8}Co_{0.1}Mn_{0.1}O_2$ obtained via coprecipitation method and a coating layer of $Li_{1.03}Ni_{0.8}Co_{0.1}Mn_{0.1}PO_4$. The method for preparing the positive active material of Example 12 includes the steps of:

Dissolving $NiSO_4$, $CoSO_4$, $MnSO_4$ at an atom ratio of 0.80:0.10:0.10 in deionized water and obtaining a mixed solution of 1 mol/L; adding 1 mol/L NaOH solution into the mixed solution, fully stirring the mixed solution and maintaining the temperature at 70° C., and obtaining loose spherical secondary particles having an average particle size of 7.5-9.0 μm after full reaction; repeatedly washing the coprecipitate with deionized water and ethanol; sintering the washed coprecipitate in air at 850° C. for 10 hours and obtaining black powders;

Mixing $H_3PO_4$ with the black powders at a mass ratio of 0.0034:1 in an inclined mixer having a rotation speed of 30 r/min for 10 hours; sintering the mixture of $H_3PO_4$ and the black powders in air at 700° C. for 6 hours;

Mixing $Li_2CO_3$ with the sintered mixture in oxygen atmosphere at 900° C. for 12 hours, and obtaining the positive active material having a core of $Li_{1.03}Ni_{0.8}Co_{0.1}Mn_{0.1}O_2$ and a coating layer of $Li_{1.03}Ni_{0.8}Co_{0.1}Mn_{0.1}PO_4$.

Example 13

The positive active material of Example 13 includes a core of $Li_{1.05}CoO_2$ obtained via coprecipitation method and a coating layer of $Li_{1.05}CoPO_4$. The method for preparing the positive active material of Example 13 includes the steps of:

Preparing the precursor via coprecipitation method: preparing 1 mol/L $CoSO_4$ solution; slowly dripping 1 mol/L $NH_4HCO_3$ solution into the $CoSO_4$ solution at a dripping rate of 1 L/h; after full coprecipitation, filtering and washing the coprecipitate with deionized water, and drying the coprecipitate;

Mixing $P_2O_5$ with the dried coprecipitate at a mass ratio of 0.0001:1 in a planetary ball mill having a rotation speed of 300 r/min for 5 hours, and sintering the mixture of $P_2O_5$ and the dried coprecipitate in air at 650° C. for 10 hours;

Mixing $Li_2CO_3$ with the sintered mixture at a mole ratio of 1.07:1 in a planetary ball mill having a rotation speed of 200 r/min for 5 hours; sintering the fully mixed mixture of $Li_2CO_3$ and the sintered mixture in air at 900° C. for 10 hours; obtaining the positive active material including a core of $Li_{1.05}CoO_2$ and a coating layer of $Li_{1.05}CoPO_4$.

Example 14

The positive active material of Example 14 includes a core of $Li_{1.01}Co_{0.89}Mg_{0.05}Al_{0.04}Ti_{0.02}O_2$ obtained via sol-gel method and a coating layer of $Li_{1.01}Co_{0.89}Mg_{0.05}Al_{0.04}Ti_{0.02}PO_4$. The method for preparing the positive active material of Example 14 includes the steps of:

Dissolving cobalt acetate, nano magnesia, nano alumina and nano titanium dioxide at a metal atom ratio of 0.89:0.05:0.04:0.02 in deionized water in a container and obtaining a mixed solution; adding citric acid into the mixed solution after cobalt acetate, nano magnesia, nano alumina and nano titanium dioxide being fully dissolved, the ratio of citric acid to the total metal ions is 2:1; stirring the mixed solution in the container in a water bath at 85° C., to evaporate the water and obtain gelatinous substance; placing the container in an oven at 160° C. for 5 hours and obtaining brown-black substance; milling the brown-black substance into powders, sintering the powders in air at 800° C. for 24 hours and obtaining particles having an average particle size of 8.0~12.0 μm;

Dispersing the sintered powders in 0.2% phosphoric acid solution at a concentration of 500 g/L and obtaining a mixed solution; placing the mixed solution in water bath of 85° C., to evaporate the water and obtain gelatinous substance; sintering the gelatinous substance in air at 750° C. for 5 hours;

Mixing $LiOH.H_2O$ with sintered gelatinous substance in air at 950° C. for 10 hours, obtaining the positive active material including a core of $Li_{1.01}Co_{0.89}Mg_{0.05}Al_{0.04}Ti_{0.02}O_2$ and a coating layer of $Li_{1.01}Co_{0.89}Mg_{0.05}Al_{0.04}Ti_{0.02}PO_4$.

Example 15

The positive active material of Example 15 includes a core of $Li_{0.98}Co_{0.98}Ti_{0.02}O_2$ obtained via coprecipitation method and a coating layer of $Li_{0.98}Co_{0.98}Ti_{0.02}PO_4$. The method for preparing the positive active material of Example 15 includes the steps of:

Preparing the precursor via coprecipitation method: preparing 1 mol/L $CoSO_4$ solution; slowly dripping 1 mol/L $NH_4HCO_3$ solution into the $CoSO_4$ solution at a dripping rate of 1 L/h; after full coprecipitation, filtering and washing the coprecipitate with deionized water, and drying the coprecipitate; mixing $CoCO_3$ and $TiO_2$ at a mole ratio of 0.98:0.02 in a planetary ball mill having a rotation speed of 200 r/min for 5 hours; and sintering the mixture of $CoCO_3$ and $TiO_2$ in air at 600° C. for 18 hours;

Mixing $P_2O_5$ with the sintered mixture at a mass ratio of 0.01:1 in a planetary ball mill having a rotation speed of 300 r/min for 5 hours; sintering the fully mixed mixture of $P_2O_5$ and the sintered mixture in air at 750° C. for 10 hours;

Mixing $LiOH.H_2O$ with the sintered mixture, sintering the fully mixed mixture of $LiOH.H_2O$ and the sintered mixture in air at 950° C. for 10 hours, and obtaining the positive active material including a core of $Li_{0.98}Co_{0.98}Ti_{0.02}O_2$ and a coating layer of $Li_{0.98}Co_{0.98}Ti_{0.02}PO_4$.

Example 16

The positive active material of Example 16 includes a core of $Li_{1.02}Ni_{0.85}Co_{0.10}Al_{0.05}O_2$ obtained via coprecipitation method and a coating layer of $Li_{1.02}Ni_{0.85}Co_{0.10}Al_{0.05}PO_4$. The method for preparing the positive active material of Example 16 includes the steps of:

Preparing the precursor via coprecipitation method: dissolving $NiSO_4$, $CoSO_4$, $Al(NO_3)_3$ at an atom ratio of 0.85:0.10:0.05 in deionized water and obtaining a mixed solution of 1 mol/L; adding 1 mol/L NaOH solution into the mixed solution, fully stirring the mixed solution and maintaining the temperature at 75° C. as well as controlling the pH value at 10.8 via adding ammonia, and obtaining loose spherical secondary particles consisting of primary particles having a diameter of 800-1200 nm after full reaction; repeatedly washing the coprecipitate with deionized water and ethanol; sintering the washed coprecipitate in air at 500° C. for 5 hours;

Mixing $P_2O_5$ with the sintered coprecipitate at a mass ratio of 0.0024:1 in a planetary ball milling having a rotation speed of 300 r/min for 5 hours, and sintering the mixture of $P_2O_5$ and the sintered coprecipitate in air at 750° C. for 10 hours;

Mixing the sintered mixture with $LiOH.H_2O$, sintering the mixture in air at 750° C. for 10 hours, and obtaining a positive active material including a core of $Li_{1.02}Ni_{0.85}Co_{0.1}Al_{0.05}O_2$ and a coating layer of $Li_{1.02}Ni_{0.85}Co_{0.1}Al_{0.05}PO_4$.

Example 17

The positive active material of Example 17 includes a core of $Li_{1.05}Ni_{0.90}Co_{0.08}Al_{0.02}O_2$ obtained via sol-gel method and a coating layer of $Li_{1.05}Ni_{0.90}Co_{0.08}Al_{0.02}PO_4$. The method for preparing the positive active material of Example 17 includes the steps of:

Dissolving nickel acetate, cobalt acetate, aluminum nitrate at an atom ratio of 0.90:0.08:0.02 in deionized water in a container and obtaining a mixed solution; adding citric acid into the mixed solution after nickel acetate, cobalt acetate, aluminum nitrate being fully dissolved, the ratio of citric acid to the total metal ions is 2:1; stirring the mixed solution in the container in a water bath at 85° C. to evaporate the water and obtain gelatinous substance; moving the container to an oven at 160° C. and heating for 5 hours, and obtaining brown-black substance; milling the brown-black substance into powders, sintering the powders in air at 750° C. for 5 hours and obtaining particles having an average particle size of 3.5~5.5 μm;

Dispersing the sintered powders in 0.8% phosphoric acid solution at a concentration of 500 g/L and obtaining a mixed solution; placing the mixed solution in water bath of 85° C., to evaporate the water and obtain gelatinous substance; sintering the gelatinous substance in air at 650° C. for 6 hours;

Mixing the sintered gelatinous substance with $LiOH.H_2O$, sintering the mixture in oxygen atmosphere at 1050° C. for 8 hours, and obtaining a positive active material including a core of $Li_{1.05}Ni_{0.90}Co_{0.08}Al_{0.02}O_2$ and a coating layer of $Li_{1.05}Ni_{0.90}Co_{0.08}Al_{0.02}PO_4$.

Example 18

The positive active material of Example 18 includes a core of $Li_{0.98}Ni_{0.50}Mn_{0.50}O_2$ obtained via sol-gel method and a coating layer of $Li_{0.98}Ni_{0.50}Mn_{0.50}PO_4$. The method for preparing the positive active material of Example 18 includes the steps of:

Dissolving nickel acetate, manganese acetate at a metal atom ratio of 0.50:0.50 in deionized water in a container and obtaining a mixed solution; adding citric acid into the mixed solution after nickel acetate, manganese acetate being fully dissolved, the ratio of citric acid to the total metal ions is 2:1; stirring the mixed solution in the container in a water bath at 85° C. to evaporate the water and obtain gelatinous substance; moving the container to an oven at a 160° C. and heating for 5 hours, and obtaining brown-black substance; milling the brown-black substance into powders, sintering the powders in air at 750° C. for 5 hours and obtaining particles having an average particle size of 8.0~12.5 μm;

Dispersing the sintered powders in 0.8% phosphoric acid solution at a concentration of 500 g/L and obtaining a mixed solution; placing the mixed solution in a water bath of 85° C., to evaporate the water and obtain a mixture; sintering the mixture in air at 650° C. for 6 hours;

Mixing the sintered mixture with $LiOH.H_2O$, sintering the mixture in air at 780° C. for 24 hours, and obtaining a positive active material including a core of $Li_{0.98}Ni_{0.50}Mn_{0.50}O_2$ and a coating layer of $Li_{0.98}Ni_{0.50}Mn_{0.50}PO_4$.

Example 19

The positive active material of Example 19 includes a core of $Li_{1.07}Ni_{0.80}Mn_{0.20}O_2$ obtained via coprecipitation method and a coating layer of $Li_{1.07}Ni_{0.80}Mn_{0.20}PO_4$. The method for preparing the positive active material of Example 19 includes the steps of:

Preparing the precursor via coprecipitation method: dissolving $NiSO_4$, $MnSO_4$ at an atom ratio of 0.80:0.20 in deionized water and obtaining a mixed solution of 1 mol/L; adding 1 mol/L NaOH solution into the mixed solution, fully stirring the mixed solution and maintaining the temperature at 75° C. as well as controlling the pH value at 10.3 via adding ammonia, and obtaining loose spherical secondary particles having an average particle size of 21~30 μm after full reaction; repeatedly washing the coprecipitate with deionized water and ethanol;

Mixing $P_2O_5$ with the washed coprecipitate at a mass ratio of 0.0003:1; sintering the mixture of the washed coprecipitate and $P_2O_5$ in a planetary ball mill having a rotation speed of 300 r/min for 5 hours, and further sintering the mixture in air at 600° C. for 3 hours;

Mixing the sintered mixture with $LiOH.H_2O$, sintering the mixture in air at 750° C. for 10 hours, and obtaining a positive active material including a core of $Li_{1.07}Ni_{0.80}Mn_{0.20}O_2$ and a coating layer of $Li_{1.07}Ni_{0.80}Mn_{0.20}PO_4$.

Example 20

The positive active material of Example 20 includes a core of $Li_{1.04}Ni_{0.85}Mn_{0.12}Al_{0.03}O_2$ obtained via sol-gel method and a coating layer of $Li_{1.04}Ni_{0.85}Mn_{0.12}Al_{0.03}PO_4$. The method for preparing the positive active material of Example 20 includes the steps of:

Dissolving nickel acetate, manganese acetate, aluminum nitrate at a metal atom ratio of 0.85:0.12:0.03 in deionized water in a container and obtaining a mixed solution; adding citric acid into the mixed solution after nickel acetate, manganese acetate, aluminum nitrate being fully dissolved, the ratio of citric acid to the total metal ions is 2:1; stirring the mixed solution in the container in a water bath at 85° C. to evaporate the water and obtain gelatinous substance; moving the container to an oven at 160° C. and heating for 5 hours, and obtaining brown-black substance; milling the brown-black substance into powders, sintering the powders in air at 750° C. for 5 hours and obtaining particles having an average particle size of 3.0~5.8 μm;

Dispersing the sintered powders in 0.8% phosphoric acid solution at a concentration of 500 g/L and obtaining a mixed solution; placing the mixed solution in a water bath of 85° C., to evaporate the water and obtain a mixture; sintering the mixture in air at 600° C. for 20 hours;

Mixing the sintered mixture with $LiOH.H_2O$, sintering the mixture in air at 1050° C. for 6 hours, and obtaining a positive active material including a core of $Li_{1.04}Ni_{0.85}Mn_{0.12}Al_{0.03}O_2$ and a coating layer of $Li_{1.04}Ni_{0.85}Mn_{0.12}Al_{0.03}PO_4$.

Comparative Example 1

The positive active material of Comparative Example 1 includes a core of $Li_{1.09}Ni_{0.1}Co_{0.5}Mn_{0.4}O_2$ obtained via coprecipitation method and 0.5 wt % of coating layer of $Li_{1.09}Ni_{0.1}Co_{0.5}Mn_{0.4}PO_4$ having a thickness of 100-200 nm. The average particle size of the secondary particles of the core of $Li_{1.09}Ni_{0.1}Co_{0.5}Mn_{0.4}O_2$ is 18-20 μm and the average particle size of the primary particles of the core of $Li_{1.09}Ni_{0.1}Co_{0.5}Mn_{0.4}O_2$ is 0.7-1.0 μm. The method for preparing the positive active material of Comparative Example 1 includes the steps of:

Dissolving $NiSO_4$, $CoSO_4$, $MnSO_4$ at a metal atom ratio of 0.1:0.5:0.4 in deionized water and obtaining a mixed solution of 1 mol/L; adding 1 mol/L NaOH solution into the mixed solution, fully stirring the mixed solution and maintaining the temperature at 75° C., and obtaining coprecipitate consisting of loose spherical secondary particles having an average particle size of 20 μm-21 μm after full reaction; repeatedly washing the coprecipitate with deionized water and ethanol; sintering the washed coprecipitate in air at 500° C. for 5 hours; Mixing $LiOH.H_2O$ with the sintered coprecipitate and sintering the mixture of $LiOH.H_2O$ and the sintered coprecipitate in air at 900° C. for 10 hours, and obtaining secondary particles of core $Li_{1.09}Ni_{0.1}Co_{0.5}Mn_{0.4}O_2$ consisting of primary particles having an average particle size of 700~1000 nm;

Mixing $P_2O_5$ with the core of $Li_{1.09}Ni_{0.1}Co_{0.5}Mn_{0.4}O_2$ at a mass ratio of 0.0025:1 in a planetary ball mill having a rotation speed of 300 r/min for 5 hours, sintering the milled mixture in air at 750° C. for 10 hours and obtaining a positive active material having a core of $Li_{1.09}Ni_{0.1}Co_{0.5}Mn_{0.4}O_2$ and a coating layer of $Li_{1.09}Ni_{0.1}Co_{0.5}Mn_{0.4}PO_4$.

Comparative Example 2

The positive active material of Comparative Example 2 includes a core of $Li_{1.09}Ni_{0.1}Co_{0.5}Mn_{0.4}O_2$ obtained via coprecipitation method and a coating layer of $Al_2O_3$. The method for preparing the positive active material of Comparative Example 2 includes the steps of:

Dissolving $NiSO_4$, $CoSO_4$, $MnSO_4$ at an atom ratio of 0.1:0.5:0.4 in deionized water and obtaining a mixed solution of 1 mol/L; adding 1 mol/L NaOH solution into the mixed solution, fully stirring the mixed solution and maintaining the temperature at 75° C., and obtaining coprecipitate consisting of loose spherical secondary particles having an average particle size of 30-60 μm after full reaction; repeatedly washing the coprecipitate with deionized water and ethanol; sintering the washed coprecipitate in air at 500° C. for 5 hours; mixing sintered coprecipitate and $LiOH.H_2O$ and sintering the mixture in air at 900° C. for 20 hours and obtaining secondary particles consisting of primary particles having an average particle size of 4.0-6.0 μm; Mixing nano $Al_2O_3$ with the sintered mixture at a mass ratio of 0.003:0.97 in a planetary ball mill having a rotation speed of 300 r/min for 5 hours; sintering the mixture in air at 900° C. for 10 hours, and obtaining a positive active material including a core of $Li_{1.09}Ni_{0.1}Co_{0.5}Mn_{0.4}O_2$ and a coating layer of $Al_2O_3$.

Comparative Example 3

The positive active material of Comparative Example 3 is $Li_{1.10}Ni_{1/3}Co_{1/3}Mn_{1/3}O_2$ obtained via coprecipitation method. The method for preparing the positive active material of Comparative Example 3 includes the steps of:

Dissolving $NiSO_4$, $CoSO_4$, $MnSO_4$ at an atom ratio of 1.0:1.0:1.0 in deionized water and obtaining a mixed solution of 1 mol/L; adding 1 mol/L NaOH solution into the mixed solution, fully stirring the mixed solution and maintaining the temperature at 75° C., and obtaining coprecipitate consisting of loose spherical secondary particles having an average particle size of 10-13 μm after full reaction; repeatedly washing the coprecipitate with deionized water and ethanol; sintering the washed coprecipitate in air at 500° C. for 5 hours; mixing and sintering the sintered coprecipitate and $LiOH.H_2O$ in air at 850° C. for 10 hours and obtaining secondary particles of positive active material $Li_{1.10}Ni_{1/3}Co_{1/3}Mn_{1/3}O_2$ consisting of primary particles having an average particle size of 0.8-1.0 μm.

Comparative Example 4

The positive active material of Comparative Example 4 is $Li_{1.08}Ni_{0.5}Co_{0.2}Mn_{0.3}O_2$ obtained via coprecipitation method. The method for preparing the positive active material of Comparative Example 4 includes the steps of:

Dissolving $NiSO_4$, $CoSO_4$, $MnSO_4$ at an atom ratio of 5.0:2.0:3.0 in deionized water and obtaining a mixed solution of 1 mol/L; adding 1 mol/L NaOH solution into the mixed solution, fully stirring the mixed solution and maintaining the temperature at 75° C., and obtaining coprecipitate consisting of loose spherical secondary particles having an average particle size of 8.0-12.5 μm after full reaction; repeatedly washing the coprecipitate with deionized water and ethanol; sintering the washed coprecipitate in air at 500° C. for 5 hours; mixing and sintering the sintered coprecipitate and $LiOH.H_2O$ in air at 800° C. for 10 hours and obtaining the positive active material $Li_{1.08}Ni_{0.5}Co_{0.2}Mn_{0.3}O_2$ including secondary particles consisting of primary particles having an average particle size of 0.6-0.8 μm.

Comparative Example 5

The positive active material of Comparative Example 5 is $Li_{0.98}Ni_{0.6}Co_{0.2}Mn_{0.2}O_2$ obtained via sol-gel method. The method for preparing the positive active material of Comparative Example 5 includes the steps of:

Dissolving lithium acetate, nickel acetate, cobalt acetate, manganese acetate at an atom ratio of 0.99:0.60:0.20:0.20 in deionized water in a container and obtaining a mixed solution; adding citric acid into the mixed solution after lithium acetate, nickel acetate, cobalt acetate, manganese acetate being fully dissolved, with the ratio of citric acid to the total metal ions being 2:1; placing the container having the mixed solution in a water bath of 85° C. and stirring to evaporate the water and obtain gelatinous substance; placing the container in an oven at 160° C. for 5 hours, and obtaining brown-black substance; milling the brown-black substance into powders, and sintering the powders in air at 750° C. for 10 hours and obtaining the positive active material of $Li_{0.98}Ni_{0.6}Co_{0.2}Mn_{0.2}O_2$.

Comparative Example 6

The positive active material of Comparative Example 6 includes a core of $Li_{0.9}Ni_{0.75}Co_{0.18}Mn_{0.1}O_2$ obtained via coprecipitation method and a coating layer of MgO. The method for preparing the positive active material of Comparative Example 6 includes the steps of:

Dissolving $NiSO_4$, $CoSO_4$, $MnSO_4$ at an atom ratio of 0.75:0.15:0.10 in deionized water and obtaining a mixed solution of 1 mol/L; adding 1 mol/L NaOH solution into the mixed solution, fully stirring the mixed solution and maintaining the temperature at 75° C., and obtaining a coprecipitate consisting of loose spherical secondary particles having an average particle size of 7.5-11.0 μm after full reaction; repeatedly washing the coprecipitate with deionized water and ethanol; mixing the washed coprecipitate with $LiOH.H_2O$ and sintering the mixture of $LiOH.H_2O$ and the washed coprecipitate in air at 700° C. for 5 hours and obtaining secondary particles consisting of primary particles having an average particle size of 4.0-6.0 μm; Mixing nano MgO with the sintered mixture at a mass ratio of 0.0005:1 in a planetary ball mill having a rotation speed of 300 r/min for 5 hours; sintering the mixture in air at 900° C. for 10 hours and obtaining a positive active material including a core of $Li_{0.9}Ni_{0.75}Co_{0.15}Mn_{0.1}O_2$ and a coating layer of MgO.

Comparative Example 7

The positive active material of Comparative Example 7 is $Li_{1.03}Ni_{0.8}Co_{0.1}Mn_{0.1}O_2$ obtained via coprecipitation method. The method for preparing the positive active material of Comparative Example 7 includes the steps of:

Dissolving $NiSO_4$, $CoSO_4$, $MnSO_4$ at an atom ratio of 8.0:1.0:1.0 in deionized water and obtaining a mixed solution of 1 mol/L; adding 1 mol/L NaOH solution into the mixed solution, fully stirring the mixed solution and maintaining the temperature at 75° C., and obtaining coprecipitate consisting of loose spherical secondary particles having an average particle size of 6.3-10.2 μm after full reaction; repeatedly washing the coprecipitate with deionized water and ethanol; sintering the washed coprecipitate in air at 500° C. for 5 hours; mixing and sintering the sintered coprecipitate and $LiOH.H_2O$ in air at 900° C. for 8 hours and obtaining a positive active material $Li_{1.03}Ni_{0.8}Co_{0.1}Mn_{0.1}O_2$ including secondary particles consisting of primary particles having an average particle size of 0.7-0.8 μm.

Comparative Example 8

The positive active material of Comparative Example 8 is $Li_{0.05}Ni_{0.9}Co_{0.05}Mn_{0.05}O_2$ consisting of single crystal particles having an average particle size of 10.0~12.0 μm obtained via solid milling method. The method for preparing the positive active material of Comparative Example 8 includes the steps of:

Mixing $Li_2CO_3$, nickel oxalate, cobalt oxalate, $MnCO_3$ at a molar ratio of 0.49:0.90:0.05:0.05 in a zirconia sander having a rotation speed of 1000 r/min for 5 hours, the diameter of the zirconia milling media is 5 mm, and the ratio of zirconia milling media to the mixture of $Li_2CO_3$, nickel oxalate, cobalt oxalate, $MnCO_3$ is 1:2; removing the zirconia milling media and sintering the remaining mixture in air at 950° C. for 24 hours and obtaining the positive active material of $Li_{0.05}Ni_{0.9}Co_{0.05}Mn_{0.05}O_2$.

Comparative Example 9

The positive active material of Comparative Example 9 is $Li_{1.01}Co_{0.89}Mg_{0.05}Al_{0.04}Ti_{0.02}O_2$ having an average particle size of 7.0~12.0 μm obtained via sol-gel method. The method for preparing the positive active material of Comparative Example 9 includes the steps of:

Dissolving lithium acetate, cobalt acetate, nano magnesia, nano alumina, nano titanium dioxide at an atom ratio of 1.03:0.89:0.05:0.04:0.02 in deionized water in a container and obtaining a mixed solution; adding citric acid into the mixed solution after lithium acetate, cobalt acetate, nano magnesia, nano alumina, nano titanium dioxide being fully dissolved, with the ratio of citric acid to the total metal ions being 2:1; setting the container having the mixed solution in a water bath of 85° C. to evaporate the water and obtain gelatinous substance; placing the container in an oven at 160° C. for 5 hours, and obtaining brown-black substance; milling the brown-black substance into powders, and sintering the powders in air at 900° C. for 24 hours and obtaining the positive active material of $Li_{1.01}Co_{0.89}Mg_{0.05}Al_{0.04}Ti_{0.02}O_2$ having an average particle size of 8.0~12.0 μm.

Comparative Example 10

The positive active material of Comparative Example 10 is $Li_{0.98}Co_{0.98}Ti_{0.02}O_2$ having an average particle size of 15~20 μm obtained via coprecipitation method. The method for preparing the positive active material of Comparative Example 10 includes the steps of:

Preparing 1 mol/L $CoSO_4$ solution; slowly dripping 1 mol/L $NH_4HCO_3$ solution into the $CoSO_4$ solution at a dripping rate of 1 L/h; after coprecipitation, filtering and washing the coprecipitate with deionized water, and obtaining $CoCO_3$ after drying; mixing $Li_2CO_3$, $CoCO_3$ and $TiO_2$ at a molar ratio of 1.01:0.98:0.02 in a planetary ball mill having a rotation speed of 200 r/min for 5 hours; sintering the fully mixed mixture of $Li_2CO_3$, $CoCO_3$ and $TiO_2$ in air at 800° C. for 18 hours, and obtaining the positive active material of $Li_{0.98}Co_{0.98}Ti_{0.02}O_2$.

Comparative Example 11

The positive active material of Comparative Example 11 is $Li_{1.02}Ni_{0.85}Co_{0.10}Al_{0.05}O_2$ having an average particle size of 7.5~12.5 μm obtained via coprecipitation method. The method for preparing the positive active material of Comparative Example 11 includes the steps of:

Dissolving $NiSO_4$, $CoSO_4$, $Al(NO_3)_3$ at an atom ratio of 0.85:0.10:0.05 in deionized water and obtaining a mixed solution of 1 mol/L; adding 1 mol/L NaOH solution into the mixed solution, fully stirring the mixed solution and maintaining the temperature at 75° C. as well as controlling the pH value at 10.6 via adding ammonia, and obtaining coprecipitate including loose spherical secondary particles consisting of primary particles having an average particle size of 800~1200 nm after full reaction; repeatedly washing the coprecipitate with deionized water and ethanol; sintering the washed coprecipitate in air at 500° C. for 5 hours; mixing and sintering the sintered coprecipitate and LiOH.H$_2$O in air at 750° C. for 10 hours and obtaining the positive active material of Li$_{1.02}$Ni$_{0.85}$Co$_{0.1}$Al$_{0.05}$O$_2$.

Comparative Example 12

The positive active material of Comparative Example 12 is Li$_{1.09}$Ni$_{0.88}$Co$_{0.10}$Al$_{0.01}$Ti$_{0.01}$O$_2$ having an average particle size of 10.5~13.0 μm obtained via sol-gel method. The method for preparing the positive active material of Comparative Example 12 includes the steps of:

Dissolving lithium acetate, nickel acetate, cobalt acetate, aluminum nitrate, nano titanium dioxide at an atom ratio of 1.11:0.88:0.10:0.01:0.01 in deionized water in a container and obtaining a mixed solution; adding citric acid into the mixed solution after lithium acetate, nickel acetate, cobalt acetate, aluminum nitrate, nano titanium dioxide being fully dissolved, with the ratio of citric acid to the total metal ions being 2:1; setting the container having the mixed solution in a water bath of 85° C. to evaporate the water and obtain gelatinous substance; placing the container in an oven at 160° C. for 5 hours, and obtaining brown-black substance; milling the brown-black substance into powders, sintering the powders in air at 750° C. for 5 hours and obtaining the positive active material Li$_{1.09}$Ni$_{0.88}$Co$_{0.10}$Al$_{0.01}$Ti$_{0.01}$O$_2$ having an average particle size of 10.5~13.0 μm.

Comparative Example 13

The positive active material of Comparative Example 13 is Li$_{0.98}$Ni$_{0.50}$Mn$_{0.50}$O$_2$ having an average particle size of 8.0~12.5 μm obtained via sol-gel method. The method for preparing the positive active material of Comparative Example 13 includes the steps of:

Dissolving lithium acetate, nickel acetate, manganese acetate at an atom ratio of 1.02:0.50:0.50 in deionized water in a container and obtaining a mixed solution; adding citric acid into the mixed solution after lithium acetate, nickel acetate, manganese acetate being fully dissolved, with the ratio of citric acid to the total metal ions being 2:1; setting the container having the mixed solution in a water bath of 85° C. to evaporate the water and obtain gelatinous substance; placing the container in an oven at 160° C. for 5 hours, and obtaining brown-black substance; milling the brown-black substance into powders, sintering the powders in air at 750° C. for 5 hours and obtaining the positive active material of Li$_{0.98}$Ni$_{0.50}$Mn$_{0.50}$O$_2$ having an average particle size of 8.0~12.5 μm.

Comparative Example 14

The positive active material of Comparative Example 14 is Li$_{1.07}$Ni$_{0.80}$Mn$_{0.20}$O$_2$ having an average particle size of 20.0~30.0 μm obtained via coprecipitation method. The method for preparing the positive active material of Comparative Example 14 includes the steps of:

Dissolving NiSO$_4$, MnSO$_4$ at an atom ratio of 0.80:0.20 in deionized water and obtaining a mixed solution of 1 mol/L; adding 1 mol/L NaOH solution into the mixed solution, fully stirring the mixed solution and maintaining the temperature at 75° C. as well as controlling the pH value at 10.3 via adding ammonia, and obtaining coprecipitate consisting of loose spherical secondary particles after full reaction; repeatedly washing the coprecipitate with deionized water and ethanol; sintering the washed coprecipitate in air at 500° C. for 5 hours and obtaining secondary particles consisting of primary particles having an average particle size of 400~600 nm; mixing and sintering the sintered coprecipitate and LiOH.H$_2$O in air at 750° C. for 10 hours and obtaining the positive active material of Li$_{1.07}$Ni$_{0.80}$Mn$_{0.20}$O$_2$.

Comparative Example 15

The positive active material of Comparative Example 15 is Li$_{1.04}$Ni$_{0.85}$Mn$_{0.12}$Al$_{0.03}$O$_2$ having an average particle size of 3.0~5.8 μm obtained via sol-gel method. The method for preparing the positive active material of Comparative Example 15 includes the steps of:

Dissolving lithium acetate, nickel acetate, manganese acetate, aluminum nitrate at an atom ratio of 1.07:0.85:0.12:0.03 in deionized water in a container and obtaining a mixed solution; adding citric acid into the mixed solution after lithium acetate, nickel acetate, manganese acetate, aluminum nitrate being fully dissolved, with the ratio of citric acid to the total metal ions being 2:1; setting the container having the mixed solution in a water bath of 85° C. to evaporate the water and obtain gelatinous substance; placing the container in an oven at 160° C. for 5 hours, and obtaining brown-black substance; milling the brown-black substance into powders, sintering the powders in air at 750° C. for 5 hours and obtaining the positive active material of Li$_{1.04}$Ni$_{0.85}$Mn$_{0.12}$Al$_{0.03}$O$_2$ having an average particle size of 3.0~5.8 μm.

Preparation of Secondary Lithium Batteries

The positive active materials according to Examples 1 to 20, Comparative Examples 1 to 15 are adopted as positive active materials to manufacture secondary lithium batteries via same process, so as to analyze the electrochemical performances of lithium transition metal oxides. The method for preparing lithium ion batteries includes the following steps.

The positive active materials according to Examples 1 to 20, Comparative Examples 1 to 15 are adopted as the positive active materials of the positive plates, respectively. Artificial graphite is adopted as negative active material of the negative plate. The positive plate, the negative plate and the separator are winded to form a secondary lithium battery after soldering terminal, packaging the aluminum foil, filling electrolyte and pumping the air. The discharge cut-off voltage of each secondary lithium battery is 2.80V. The charge cut-off voltage of each secondary lithium battery is 4.50V (relative to the electric potential of lithium 4.55V). The design capacity of each secondary lithium battery is 2500 mAh.

Performance Analysis

The performances of secondary lithium batteries according to Examples 1 to 20 and Comparative Examples 1 to 15 are assessed and shown in Table 1.

1. Cycling performance: Each secondary lithium battery is charged at a constant current of 0.5 C (1225 mA) at 25° C. until the voltage reaches 4.50V. Each secondary lithium battery is then charged at a constant voltage of 4.50V until the current reaches 0.05 C (123 mA). Each secondary lithium battery is further discharged at a current of 0.5 C (1225 mA) until the voltage reaches 2.80V. The charge and discharge cycle is repeated for 1000 times. The discharge capacity of the first cycle and the discharge capacity of the 1000th cycle are determined. The capacity retention rate of each secondary lithium battery is calculated according to the following formula:

The capacity retention rate=(discharge capacity of the 1000th cycle/discharge capacity of the first cycle)×100%.

2. Rate capacity: Each secondary lithium battery is charged at a constant current of 0.5 C (1225 mA) at 25° C. until the voltage reaches 4.50V. Each secondary lithium battery is charged at a constant voltage of 4.50V until the current reaches 0.05 C (123 mA). Each secondary battery is discharged at a constant current of 0.5 C (1225 mA) until the voltage reaches 2.80V. The capacity of each secondary lithium battery is marked as C1. Each secondary lithium battery is further charged at a constant current of 0.5 C (1225 mA) until the voltage reaches 4.50V. Each secondary lithium battery is charged at a constant voltage of 4.50V until the current reaches 0.05 C (123 mA). Each secondary battery is discharged at a current of 2 C (5000 mA) until the voltage reaches 2.80V. The capacity of each secondary lithium battery is marked as C2.

The capacity retention rate of rate discharge of each secondary lithium battery is calculated according to the formula: the capacity retention rate of rate discharge=C2/C1×100%.

3. High temperature storage performance. Each secondary lithium battery is charged at a constant current of 0.5 C (1225 mA) at 25° C. until the voltage reaches 4.50V. Each secondary lithium battery is charged at a constant voltage of 4.50V until the current reaches 0.05 C (123 mA). Each secondary battery is discharged at a constant current of 0.5 C (1225 mA) until the voltage reaches 2.80V. The thickness of each secondary lithium battery prior to storage and the first discharge capacity is determined. Each fully charged secondary lithium battery is stored in an oven at 60° C. for 100 days. The thickness of each secondary lithium battery after storage is determined. The expansion rate of each secondary lithium battery after storage is calculated. Each stored secondary lithium battery is charged at a constant current of 0.5 C (1225 mA) until the voltage reaches 4.50V. Each secondary lithium battery is charged at a constant voltage of 4.50V until the current reaches 0.05 C (123 mA). Each secondary lithium battery is discharged at a constant current of 0.5 C (1225 mA) until the voltage reaches 2.80V. The charge and discharge cycle is repeated for five cycles. The final discharge capacity is recorded. The capacity retention rate relative to the first discharge capacity is calculated according to the following formula.

Expansion rate of a stored secondary lithium battery=(thickness of a stored secondary lithium battery−thickness of a secondary lithium battery prior to storage)/thickness of a secondary lithium battery prior to storage×100%.

Capacity retention rate of a stored secondary lithium battery=(discharge capacity after 100 days storage)/(discharge capacity of the first cycle)×100%.

4. Safety performance test: Each secondary lithium battery is charged at a constant current of 0.5 C (1225 mA) at 25° C. until the voltage reaches 4.50V. Each secondary lithium battery is charged at a constant voltage of 4.50V until the current reaches 0.05 C (123 mA). Each secondary lithium battery is disassembled in a glovebox full of Argon. The positive plate of each secondary lithium battery is taken out and washed in DMC solution. After the DMC has completely evaporated, the positive active material is scratched from the positive plate. 10 mg scratched positive active material of each secondary lithium battery is put in an aluminum crucible. The aluminum crucible is sealed after 0.1 μL electrolyte has been added. The scanning temperature of the DSC test is 50~500° C. and the heating rate is 10° C./min.

TABLE 1

Performance Test Results of lithium second batteries according to Examples and Comparative Examples

| | Capacity retention rate of secondary lithium battery after cycling | Capacity retention rate of rate discharge | Expansion rate of stored secondary lithium battery | Capacity retention rate of a stored secondary lithium battery | DSC heat release (J/g) | Maximum DSC Exothermic peak (□) |
|---|---|---|---|---|---|---|
| Example 1 | 94.30% | 87.1% | 2.53% | 92.10% | 601 | 288 |
| Example 2 | 95.60% | 82.5% | 4.10% | 93.10% | 623 | 316 |
| Example 3 | 90.30% | 78.9% | 2.21% | 94.80% | 704 | 328 |
| Example 4 | 92.50% | 85.1% | 2.60% | 95.10% | 801 | 301 |
| Example 5 | 89.30% | 76.3% | 1.90% | 93.10% | 820 | 271 |
| Example 6 | 87.15% | 81.2% | 3.10% | 87.90% | 798 | 278 |
| Example 7 | 80.30% | 71.0% | 3.90% | 86.70% | 887 | 246 |
| Example 8 | 84.80% | 83.1% | 2.60% | 94.50% | 823 | 257 |
| Example 9 | 89.20% | 85.1% | 2.10% | 92.50% | 901 | 220 |
| Example 10 | 96.30% | 79.9% | 0.35% | 93.80% | 782 | 312 |
| Example 11 | 96.90% | 86.7% | 1.20% | 96.30% | 603 | 308 |
| Example 12 | 86.80% | 72.6% | 3.60% | 87.60% | 911 | 252 |
| Example 13 | 74.60% | 78.1% | 12.60% | 82.60% | 1021 | 231 |
| Example 14 | 76.20% | 74.9% | 14.30% | 75.90% | 1071 | 257 |
| Example 15 | 75.30% | 81.0% | 13.10% | 87.10% | 1030 | 246 |
| Example 16 | 70.70% | 74.1% | 16.20% | 91.20% | 901 | 238 |
| Example 17 | 73.90% | 77.9% | 15.80% | 83.30% | 870 | 242 |
| Example 18 | 82.30% | 76.4% | 9.50% | 91.60% | 678 | 279 |
| Example 19 | 87.40% | 74.6% | 12.30% | 85.60% | 800 | 251 |
| Example 20 | 79.20% | 70.8% | 14.30% | 83.20% | 855 | 254 |
| Comparative Example 1 | 93.40% | 85.2% | 2.60% | 93.20% | 612 | 298 |
| Comparative Example 2 | 77.20% | 82.0% | 5.05% | 82.00% | 691 | 290 |
| Comparative Example 3 | 75.80% | 80.0% | 7.10% | 86.20% | 659 | 317 |
| Comparative Example 4 | 65.20% | 72.0% | 12.20% | 73.80% | 850 | 296 |
| Comparative Example 5 | 52.20% | 70.0% | 23.10% | 61.20% | 865 | 271 |
| Comparative Example 6 | 60.70% | 71.3% | 12.05% | 67.50% | 853 | 260 |

TABLE 1-continued

Performance Test Results of lithium second batteries according to Examples and Comparative Examples

|  | Capacity retention rate of secondary lithium battery after cycling | Capacity retention rate of rate discharge | Expansion rate of stored secondary lithium battery | Capacity retention rate of a stored secondary lithium battery | DSC heat release (J/g) | Maximum DSC Exothermic peak (□) |
|---|---|---|---|---|---|---|
| Comparative Example 7 | 56.80% | 69.0% | 30.20% | 65.70% | 976 | 237 |
| Comparative Example 8 | 55.60% | 72.0% | 20.50% | 63.50% | 1058 | 215 |
| Comparative Example 9 | 65.00% | 65.0% | 30.70% | 40.20% | 1378 | 214 |
| Comparative Example 10 | 42.60% | 72.0% | 28.10% | 36.00% | 1689 | 226 |
| Comparative Example 11 | 56.70% | 73.0% | 29.10% | 70.60% | 1160 | 215 |
| Comparative Example 12 | 69.00% | 68.1% | 24.10% | 70.60% | 1346 | 209 |
| Comparative Example 13 | 72.60% | 70.1% | 18.60% | 70.10% | 860 | 263 |
| Comparative Example 14 | 70.90% | 69.1% | 19.70% | 70.60% | 975 | 214 |
| Comparative Example 15 | 68.20% | 68.2% | 33.90% | 50.30% | 1057 | 220 |

It is clearly shown in Table 1 that:

1) The positive active material having coating layer of transition metal oxide prepared via the method of the present invention has remarkably improved charge-discharge cycling performance at 2.80V~4.50V. Comparing Examples 1 to 20 and Comparative Examples 1 to 15, after 1000 cycles, the positive active material having coating layer of transition metal oxide of the present invention has higher capacity retention rate than that of an ordinary transition metal oxide positive active material. In other word, the positive active material having coating layer of transition metal oxide has desirable cycling performance, especially the cycling performance at high voltage of 4.50V, because the coating layer can stabilize the core.

2) The positive active material having the coating layer of transition metal oxide prepared via the method of the present invention has remarkably improved rate capacity performance at 4.50V. Comparing Examples 1 to 20 and Comparative Examples 1 to 15, the positive active material having coating layer of transition metal oxide of the present invention has much higher capacity retention rate under rate discharge than that of an ordinary transition metal oxide positive active material. The positive active material having coating layer of transition metal oxide of the present invention has desirable rate capacity, especially the rate capacity at high voltage of 4.50V, because during the preparation of the positive active material, lithium ions diffuses from the outer side of the phosphate into the inside of the core, which will lead to formation of lithium ion diffusion channels. In other words, the positive active material having coating layer of transition metal oxide prepared via the method of the present invention has high ions conductivity.

3) The positive active material having coating layer of transition metal oxide prepared via the method of the present invention has remarkably improved high temperature storage performance at 4.50V. Comparing Examples 1 to 20 and Comparative Examples 1 to 15, after being stored at 60° C. for 100 days, the secondary lithium battery adopting the positive active material having coating layer of transition metal oxide of the present invention has much less expansion rate than that of a secondary lithium battery adopting ordinary transition metal oxide. In other words, the positive active material having coating layer of transition metal oxide of the present invention has desirable cycling performance and remarkably improved temperature storage performance at a voltage of 4.50V. This is because the coating layer has higher chemical stability and electrochemical stability, which can readily reduce the catalytic activity of the positive active material.

4) The positive active material having coating layer of lithium transition metal oxide prepared by the method of the present invention has remarkably improved safety performance at 4.50V. Comparing Examples 1 to 20 and Comparative Examples 1 to 15, when charged to 4.55V, DSC exotherm of the secondary lithium battery using the positive active material having coating layer of lithium transition metal oxide of the present invention is much less than that of a secondary lithium battery using ordinary transition metal oxide positive active material, while the maximum DSC exothermic peak thereof is much higher than that of the secondary lithium battery using ordinary transition metal oxide positive active material. Phosphate has stable crystal structure. The coating layer of phosphate can improve the thermal stability of the positive active material and improve the safety performance of the secondary lithium battery. The coating layer in situ formed on the core can effectively eliminate the sites having high reactivity on the surface of the core, reduce the catalytic activity of the final product in the secondary lithium battery and, therefore, obtain improve stability of the positive active material.

Summarizing the above, the method for preparing a positive active material for a secondary lithium battery according to the present invention has the following advantages.

Firstly, the coating layer can conduct lithium ions. Compared with other oxide coating layer, the coating layer according to the present invention has higher lithium-ion conductivity. In addition, the method according to the present invention deposits P source on the core, and then lithiates the core and the coating layer at the same time, which can facilitate the formation of smooth diffusion channels for lithium ions and obtain desirable high rate discharge capability.

Secondly, the coating layer has stable chemical stability and electrochemical stability. The transition metals in the coating layer mainly has valence of +2, which will remarkably reduce the catalytic activity of the core and improve the chemical stability of the positive active material. In addition, phosphate has stable crystal structure. The coating layer of phosphate can improve the thermal stability of the positive active material and further improve the safety performance of the secondary lithium battery.

Thirdly, the coating layer is in situ formed on the core. Part of the coating layer comes from the core. Therefore, the coating layer can be uniformly formed on the core and inconsistency of the positive active material is reduced.

Fourthly, the coating layer is apt to be formed on the sites having high reactivity of the core. The method according to the present invention can effectively eliminate the sites having high reactivity on the surface of the core, thereby reducing the catalytic activity of the final product in the lithium ion battery and obtaining stable positive active material.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A method for preparing a positive active material for a secondary lithium battery, comprising the steps of:
   1) synthesizing a first intermediate product of a core represented by formula $Li_xM_yN_{1-y}O_{2-\alpha}A_\beta$, wherein the first intermediate product is a compound containing an element represented by M or is a compound containing elements represented by M and N;
   2) adding phosphorous (P) containing source into the first intermediate product of step 1) and sintering a mixture of the phosphorous (P) containing source and the first intermediate product at 200~1200° C., and obtaining a second intermediate product coated with a coating layer which does not contain lithium;
   3) adding degradable lithium salt into the second intermediate product of step 2) and sintering a mixture of the second intermediate product coated with the coating layer which does not contain lithium and the degradable lithium salt at 400~1200° C., and obtaining a positive active material including a core and a coating layer coating the core;
   wherein the core of the positive active material is a lithium transition metal oxide represented by formula $Li_xM_yN_{1-y}O_{2-\alpha}A_\beta$, the coating layer is a lithium transition metal phosphate represented by formula $Li_aM_bN'_{1-b}PO_{4-\lambda}B_\zeta$ in situ formed on a surface of the core, and the element represented by M is at least one of Ni, Co and Mn; the element represented by N and N' each is at least one of Na, K, Rb, Cs, Be, Mg, Ca, Sr, Ba, Ra, Al, Ga, In, Ge, Sn, Sc, Ti, V, Cr, Mn, Fe, Co, Ni, Cu, Zn, Y, Zr, Nb, Mo, Ru, Rh, Pd, Ag, Cd, La, Ce, Pr, Nd, Sm, Eu, Gd, Tb, Dy, Ho, Er, Tm, Yb, Lu; element represented by A and B each is at least one of N, F, P, S, Cl, Se; and $0.9 \leq x \leq 1.2$, $0.6 \leq y \leq 1.0$, $0.9 \leq a \leq 1.1$, $0.6 \leq b \leq 1.0$, $0 \leq \alpha \leq 0.2$, $0 \leq \beta \leq 0.4$, $0 \leq \lambda \leq 0.5$, $0 \leq \zeta \leq 0.5$.

2. The method of claim 1, wherein the first intermediate product synthesized in step 1) is obtained via one of solid milling method, liquid coprecipitation method, sol-gel method, combustion method, solvothermal method and Pechini method.

3. The method of claim 1, wherein the first intermediate product in step 1) is a hydroxide; a nitrate; a carbonate; an acetate; an oxalate; an organic salt containing C, N, O and H; or is oxide particle obtained via sintering a mixture comprising two or more of a hydroxide, a nitrate, a carbonate, an acetate, an oxalate and an organic salt containing C, N, O and H.

4. The method of claim 1, wherein the first intermediate product in step 1) comprises loose secondary particles, secondary aggregates of loose nano particles, compact primary single crystal particles, compact secondary particles or any mixture thereof.

5. The method of claim 1, wherein the phosphorous (P) containing source in step 2) comprise at least one of elementary substance P, $P_2O_3$, $P_2O_5$, $H_3PO_4$, $H_3PO_3$, $H_3PO_2$, $(NH_4)_3PO_4$, $(NH_4)_2HPO_4$, $(NH_4)H_2PO_4$, $(NH_4)_3PO_3$, $(NH_4)_3PO_2$, phosphate ester, phosphite ester, and a compound containing element P and at least two elements of C, H, O, N.

6. The method of claim 1, wherein the phosphorous (P) containing source in step 2) uniformly disperses on the surface of the particles of the first intermediate product via one of solid milling method, solvothermal method, sol-gel method, liquid phase mixing method and vapor deposition method.

7. The method of claim 6, wherein the phosphorous (P) containing source in step 2) is elementary substance P, $P_2O_3$, $P_2O_5$, phosphate ester, phosphite ester which can be added via solid milling method; or the phosphorous (P) containing source in step 2) is $H_3PO_4$, $H_3PO_3$, $H_3PO_2$, $(NH_4)_3PO_4$, $(NH_4)_2HPO_4$, $(NH_4)H_2PO_4$, $(NH_4)_3PO_3$, $(NH_4)_3PO_2$ which can be added via one of solvothermal method, sol-gel method, liquid phase mixing method and vapor deposition method.

8. The method of claim 1, wherein in step 2) the element represented by N' and the phosphorous (P) containing source are added at the same time, N' and N are same or different, the phosphate on the surface of the core in step 2) is a phosphate containing element represented by M or a phosphate containing elements represented M and N'.

9. The method of claim 1, wherein the sintering temperature in step 2) is 500~900° C.

10. The method of claim 1, wherein the degradable lithium salt in step 3) is at least one of lithium carbonate, lithium hydroxide monohydrate, lithium hydroxide, lithium nitrate, lithium fluoride, lithium acetate and lithium oxalate.

11. The method of claim 1, wherein the sintering temperature in step 3) is 500~900° C.

* * * * *